United States Patent
Goker et al.

(10) Patent No.: US 6,943,979 B2
(45) Date of Patent: Sep. 13, 2005

(54) METHOD AND APPARATUS FOR WRITTEN-IN TRACKING ERROR COMPOSITION FOR LINEAR TAPE DRIVES

(75) Inventors: Turguy Goker, Solana Beach, CA (US); Sanwu Tan, Irvine, CA (US)

(73) Assignee: Certance, LLC, Scotts Valley, CA (US)

( * ) Notice: Subject to any disclaimer, the term of this patent is extended or adjusted under 35 U.S.C. 154(b) by 86 days.

(21) Appl. No.: 10/739,402

(22) Filed: Dec. 19, 2003

(65) Prior Publication Data

US 2004/0218304 A1 Nov. 4, 2004

Related U.S. Application Data

(60) Provisional application No. 60/435,676, filed on Dec. 19, 2002.

(51) Int. Cl.$^7$ .............................................. G11B 5/584
(52) U.S. Cl. ................................................... 360/77.12
(58) Field of Search ............................... 360/77.12, 75, 360/70, 76

(56) References Cited

U.S. PATENT DOCUMENTS

| | | | |
|---|---|---|---|
| 6,061,199 A | 5/2000 | Goker et al. | |
| 6,437,934 B2 | 8/2002 | Goker | |
| 6,700,729 B1 * | 3/2004 | Beck et al. | ............ 360/76 |

* cited by examiner

Primary Examiner—David Hudspeth
Assistant Examiner—Mitchell Slavitt
(74) Attorney, Agent, or Firm—Thelen Reid & Priest, LLP

(57) ABSTRACT

An arrangement and method for compensating for the written-in tracking error for a linear tape drive filters out spatial error components of a position error signal (PES). The position information contained within A, B pairs of servo stripes, and within C, D pairs of stripes is preserved. The timing between the A and C bursts and the C and A bursts is filtered, such as by low pass filtering, to filter out the error that can be written-in by a servo writer. The timing signal for the A, B bursts and C, D bursts are divided by the filtered timing signals for the AC and CA timing signals, respectively. This ratio provides the filtered PES signal used by a head positioner to precisely position the head with respect to the tape.

20 Claims, 4 Drawing Sheets

METHOD AND APPARATUS FOR WRITTEN-IN TRACKING ERROR COMPOSITION FOR LINEAR TAPE DRIVES

RELATED APPLICATIONS

This application claims priority to provisional application Ser. No. 60/435,676, filed on Dec. 19, 2002, the entire contents of which are hereby incorporated in their entirety.

FIELD OF THE INVENTION

The present invention relates to the field of tape drives, and more particularly, to a tracking servo system employed to adjust the relative position of a write/read head to a recording tape.

BACKGROUND OF THE INVENTION

High-density recording on multiple tracks of a magnetic tape is known. In certain arrangements, parallel tracks extend along a longitudinal direction of the magnetic tape. Magnetic tape is moved transversely across a magnetic head so that a read and/or write gap of the magnetic head is moved in proximity to the desired track. During a recording or playback, the head needs to stay in position as the tape moves in a longitudinal direction across the read/write cap. To increase storage capacities to meet increased demands, track density, which is the number of tracks per distance (e.g., inches), has been increased. As this track density increases, the track pitch and width decrease. For proper read/write operation, the magnetic head must stay at, or very near, the center line of the track. Due to this reduced track pitch, improvements to the head positioner are needed to minimize the offset between the head and the center line of the track. One important feature of such a position is that it allows the drive to monitor the head-to-track relationship. If the drive determines that the head and track are offset, then the head positioner corrects the relative position to maintain the relationship between the head and the center line of the track.

Closed loop positioners are often used in tape systems having higher track densities. In high-density tape systems, the tape may wander in the lateral direction as it moves in the longitudinal direction, which results in an offset between the magnetic head and the track center line. To avoid these types of problems, tape cartridges for high-density tape drives are preformatted with information often called servo information, which is used to maintain the correct lateral position of the tape with respect to the magnetic head. Servo information provides the system with feedback to communicate to the system the continuous position of the tape. Servo information can alert the system about the occurrence of an offset. Based on the information that an offset has occurred, the head is moved by a positioner to the center line of the track so that write/read operations can occur properly.

Closed loop positioners use "fine positioners" to move the head during a write/read operation. These fine positioners are used to maintain the position of the head at the center line of the track under a closed loop servo control using the preformatted servo information on the tape. Fine positioners generally include a head-carriage assembly, which comprises a magnetic head, a top head carriage, a voice coil motor, and a bottom head carriage.

The tracking servo system employed by linear tape drives, such as the LTO (Linear Tape Open) family, for example, increases the track density. Track density is one of the parameters, besides bit density, that allows storage capacity to increase. The tracking servo system requires feedback to indicate the relative position of the tape and the recording head elements. One of the methods employed in linear tape drives using such feedback signals is to pre-record a series of magnetic stripes that contain position feedback information, which is a timing based signal. When the stripes are recorded with predetermined azimuth angles, the signals from the head can be processed to decode the lateral position information regarding the relative position of the head and the tape.

The decoding of the lateral position information is based on timing of the detected pulses. As the magnetic head moves up and down relative to the tape, the timing of the pulses changes indicating the position feedback signal. This decoding process relies on the precise pre-recording of the servo stripe pulses without any written-in tape speed fluctuations. Such fluctuations can result in position errors, which would cause the tracking servo system to erroneously react to the fluctuations. For example, if the speed of the tape fluctuates while writing servo stripes, the timing based signal used in the position feedback information will be incorrect when the tracking servo system reads the pre-recorded servo stripes. Based on this erroneous information, the tracking servo system will erroneously react and mis-position the magnetic head with respect to the tape.

SUMMARY OF THE INVENTION

There is a need for an arrangement and method for filtering out written-in tape speed related fluctuations (spatial error), in a manner that does not compromise the position feedback signaling integrity and without introducing time delays to the tracking loop computation.

These and other needs are met by embodiments of the present invention which provide a tape drive comprising a servo mark detector to detect servo marks on a tape and generate a detection signal. Servo marks have been recorded on a tape in a first set of servo marks recorded simultaneously and a second set of servo marks recorded simultaneously and subsequently to the recording of the first set of servo marks. A position error signal (PES) determiner is coupled to the servo mark detector to receive the detection signal. The PES determiner measures a first time between servo marks within the first set of servo marks. It also measures a second time between the first set of servo marks and the second set of servo marks. The second time is filtered by the PES determiner. The first time is divided by the filtered second time in order to determine the PES.

Since the servo marks within the first set of servo marks are recorded simultaneously, there is no written-in tape speed error carried by these marks. However, since the second set of servo marks are not recorded at the same time as the first set of servo marks, there is the potential for a written-in tape speed error between the recording of the first set of servo marks and the second set of servo marks. Any spatial errors between these sets of marks will cause a disturbance signal to the tracking loop. The filtering of the second time (i.e., the time between the first and second sets of marks) measured by the PES determiner filters the spatial error component to improve the PES determination without compromising the position feedback signal integrity and without introducing time delays to the tracking loop computation.

The earlier stated needs are also met by embodiments of the present invention which provide a method of compensating for written-in format tracking error in a tape drive. This method comprises the steps of obtaining timing signals from detected servo marks on a tape and filtering a spatial error component from the timing signals without filtering a lateral displacement component. A position error signal is determined from the timing signals after the filtering of the spatial error component.

The earlier stated needs are also met by a still further aspect of the present which provides the tape drive with a tracking servo system comprising a servo mark detector and means for generating a position error signal (PES) with a filtered spatial error component.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the use of a tracking servo system that increases the track density. A problem with such a system relates to the written tape speed error potential that occurs during the preformatting of the tape. Certain timing signals are tape speed related such that during the write process, the speed of the web process must be controlled very precisely in order to position the servo stripe pulses accurately. Any spatial error between these sets of stripes will cause a disturbance signal to the tracking loop when the servo tracking is employed. In most cases, the spatial errors are caused by longitudinal resonance, web guiding roller once round frequencies. When the drive utilizes these servo stripes for tracking, the written-in spatial errors when read at a specific tape speed behave as if there is resonance disturbance at the frequency function of the tape speed and spatial distances.

A potential method of eliminating the unwanted signals is to simply filter the PES feedback. However, since tape speed varies over a wide range, the disturbance frequency also varies and makes the filtering process quite difficult. Also, for high performance tracking loops, any filtering that is done at the feedback causes time delays that translate into loss of bandwidth and gain margins to the servo loop. There is a very fine line between the filtering of PES and loop bandwidth requirements.

The present invention solves these problems, in part, by providing for a filtering of the spatial error component of the PES signal rather than the lateral displacement component. This method achieves this filtering without compromising the loop bandwidth.

Figure 1:
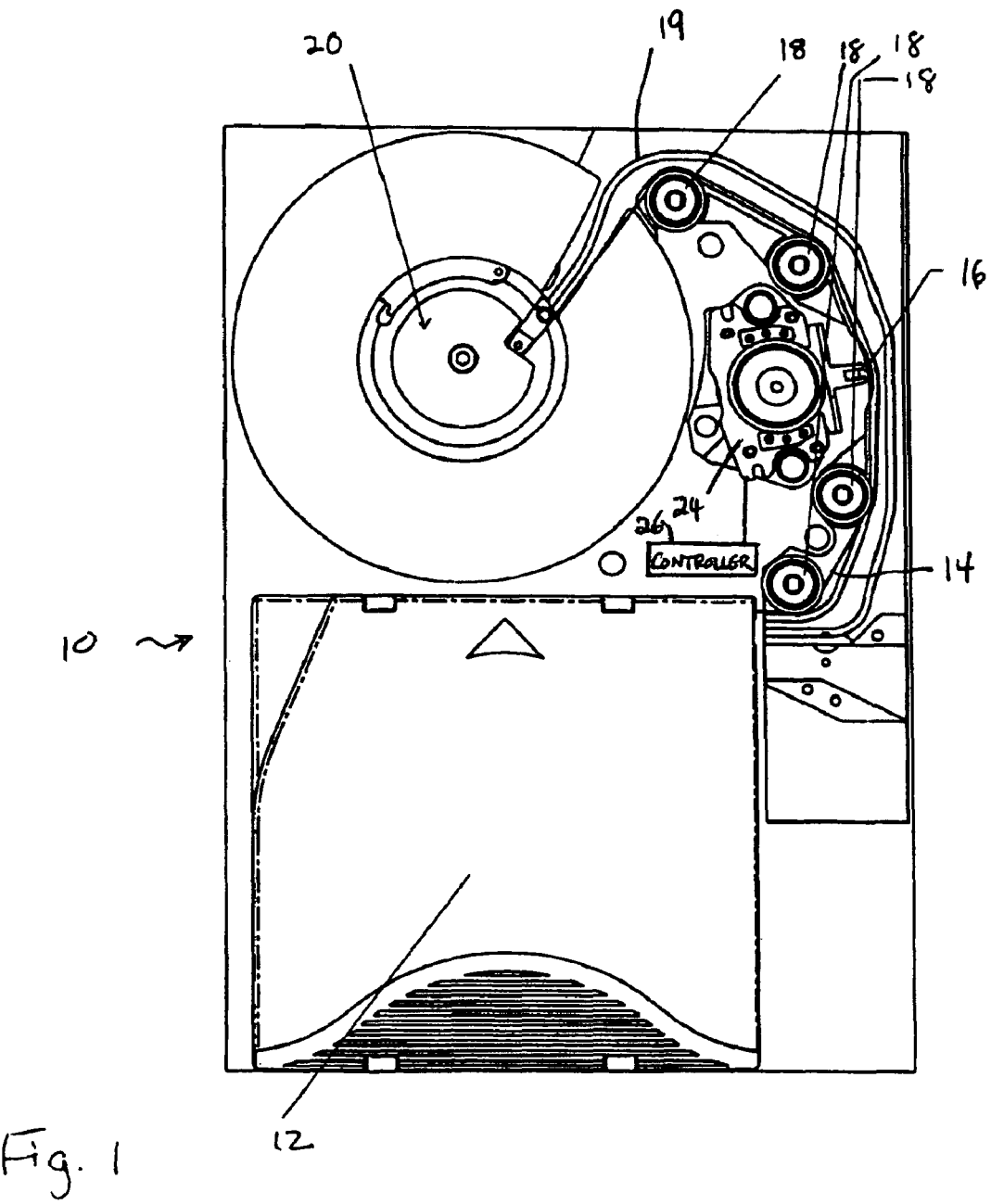
FIG. 1 is a depiction of an exemplary linear tape drive in which the present invention can be utilized.

FIG. 1 shows an exemplary embodiment of a tape drive utilizing the invention. The invention may also be used with other types of tape drives, but the invention is being described with respect to the drive of FIG. 1 for purposes of explanation only. The figure shows the tape drive 10 in a normal plan view. Tape cartridge 12 is inserted into the tape drive 10. Tape 14 is depicted as threaded into the take-up hub assembly 20. Tape 14 is guided by tape guides 18 past the recording head 16. A guide track 19 is used to guide a tape leader between the tape cartridge 12 and the take-up hub assembly 20. A head positioning mechanism is schematically indicated as block 24 and coupled to the recording head 16. In response to control signals from a controller 26, the head positioning mechanism 24 adjusts the position of the head 16. The controller 26 generates these control signals in response to the detected servo stripes pre-recorded on the tape 14.

Figure 2:
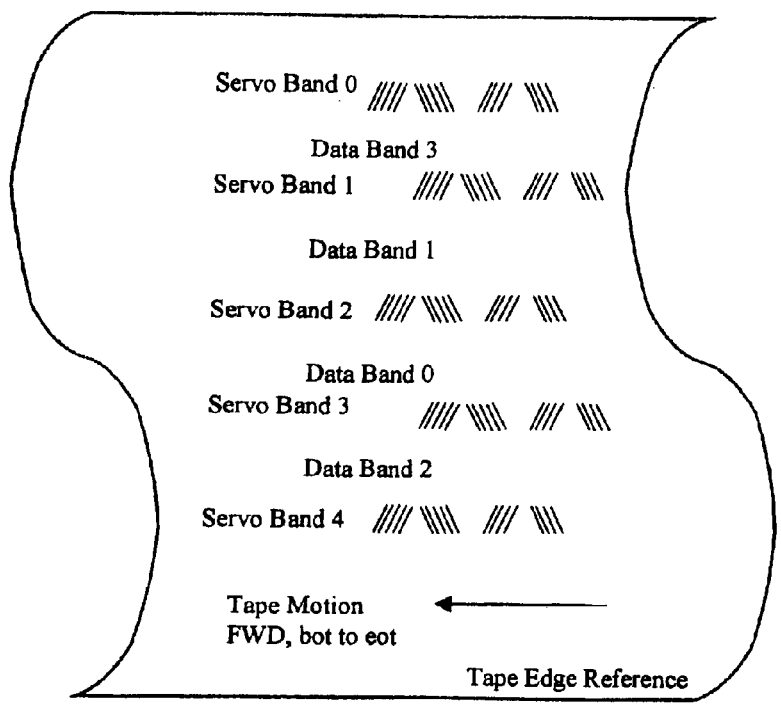
FIG. 2 is a schematic depiction of a LTO position error signal (PES) servo format pre-recorded on a tape.

Referring to FIG. 2, an exemplary LTO PES servo format is schematically depicted. There are five servo bands, 0–4, laterally spaced apart from one another. In between the servo bands are four data bands, 0–3. In the LTO format, the PES feedback is defined as the timing based servo system. The timing pulse is generated by the detection of the servo stripes and is decoded into ratios whereby the tracking algorithm formulates the position error signal, PES.

Figure 3:
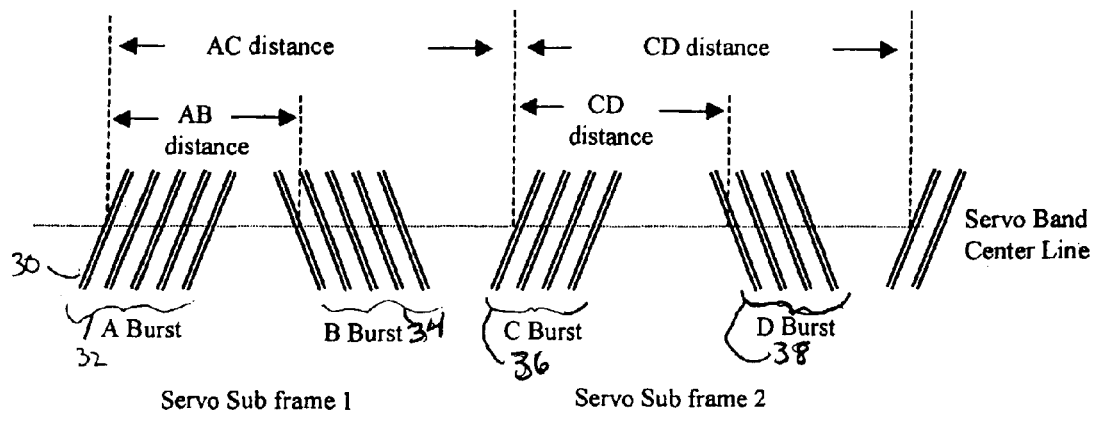
FIG. 3 is a detailed schematic depiction of a PES format of pre-recorded servo stripes on a preformatted tape.

Referring also now to FIG. 3, a servo stripe 30 comprises two magnetic transitions that are spaced 2.1 microns apart in exemplary embodiments of the invention. The width of a servo stripe is 186 microns, for example. As depicted in FIG. 3, the servo stripes 30 are arranged in groups, referred to as servo bursts. There are four distinct types of servo bursts, A, B, C, and D. These bursts are respectively referred to with numerals 32, 34, 36, 38 in FIG. 3. The A and B bursts both consist of five stripes, while the C and D bursts are four stripes each. The relative spacing of these stripes within each group provides encoded linear tape position information (LPOS), as is conventional.

The average distance of A to B stripes 30, and C to D stripes 30 is 50 microns. The average distance of the A stripes to the C stripes, and the C stripes to the A stripes, are 100 microns. The stripe azimuth angle is six degrees (6°) in the embodiment of FIG. 3.

Figure 4:
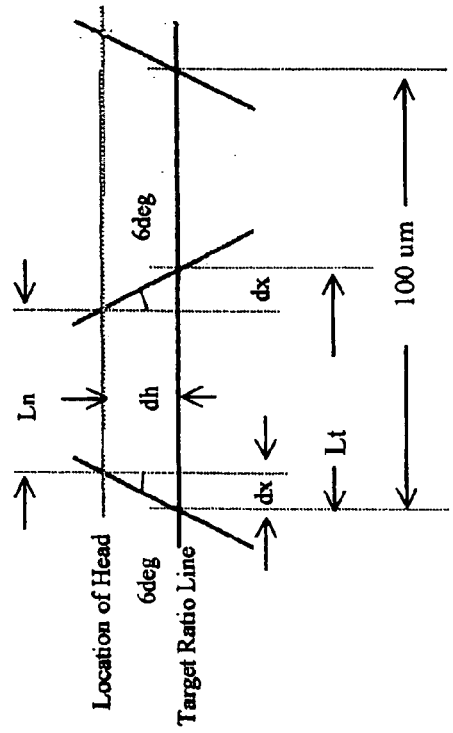
FIG. 4 is a schematic diagram explaining the conversion of a PES ratio to lateral displacement.

The conversion of the PES ratio to a lateral displacement (LEDS) is explained with the help of FIG. 4. Individual servo stripes 30 in the bursts of a subframe, such as an A burst and a B burst, are depicted. The calculation to convert the position error signal ratio (PES) to LEDS or (dh), is as follows:

$$PES = \frac{L_n}{100} \; PES \; \text{ratio},$$

valid range 0.3 to 0.7

$$TargetRatio = \frac{L_t}{100}$$

deltaRatio=TargetRatio−PES $$deltaRatio = \frac{L_t}{100} - \frac{L_n}{100}$$

$$L_t = L_n + 2 \cdot dx$$

$$deltaRatio = \frac{2 \cdot dx}{100}$$

$$dh = \frac{dx}{\tan(6°)}$$

$$deltaRatio = \frac{dh \cdot \tan(6°)}{50}$$

$$dh = \frac{50}{\tan(6°)} \cdot deltaRatio$$

PES ratio error to LDES in microns Conversion
dh=475.7182227.deltaRatio

In conventional tapes employed with linear tape drives, the servo PES is prewritten to the tape by the servo writer, with each manufacturing controlling the specification for their formatter. According to the LTO format specification, the A to C and C to A distance is 100.00+/−0.15 microns over 1 m of tape. The A to C and C to A distance is 100.00+/−0.25 microns over 7.2 mm tape. The AB and CD center line distance is 50.00+/−0.05 microns over 7.2 mm tape.

When the A and B stripe pairs are written, they are written at the same time by the servo format head. The same holds true for the C and D stripe pairs. Since each of the stripe pairs in the respective subframes are written simultaneously within the subframe, any longitudinal independent speed variation in the tape speed will not have an effect on the physical distance within these pairs. Therefore, the actual spatial accuracy will not have a significant dynamic term. By contrast, the AC and CA stripes are a result of a fixed time at a constant tape speed. Therefore, the spatial accuracy will have a component that is dynamic, in contrast to the AB and CD pairs. It is the demodulation of this term during the servo tracking that causes an ambiguity to the tracking loop by behaving as a resonance type disturbance.

When the PES format is written by the servo writer, the servo format head stamps both A and B pairs simultaneously, followed by the C and D pairs simultaneously. Timing is used to control the distance between the individual pairs. The A and B pair of servo marks shall be referred to as the first set of servo marks, while the C and D pair may be referred to as the second set of servo. However, this is explemplary only, as the C,D marks may be the first set of marks and the A,B marks the second set.

The servo format is free of speed errors for the AB and CD stripes respectively, but has the possibility of having written-in errors due to the speed and tape path issues. These issues include tape speed ISV at high frequencies during writing, timing PLL (Phase Locked Loop) jitters and longitudinal tape path resonance. When this information is processed, a high frequency noise may actually be introduced that can appear as a resonance to the tracking servo loop. This may be fatal to the high performance system if the noise exists near the amplification region of the suppression curve. Since the frequency of the noise signal is tape speed dependent when processed, the noise signal actually varies over a wide range of frequency band. In the following description, this is defined in cycles/m units.

The mathematical derivation of the actual PES with the frequency error component that gets written-in is as follows:

$$PES = \frac{L_{ab}V}{L_{ac}V} = \frac{L_{ab}V}{(L_{ac0} + \Delta L)V}$$

V is the tape speed during R/W
$L_{ac0}$ is the ideal distance per LTO spec and $\Delta L$ is the variations due to servo writer $$PES = \frac{L_{ab}}{L_{ac0} + \Delta L} = \frac{L_{ab}}{L_{ac0}\left(1 + \frac{\Delta L}{L_{ac0}}\right)} PES_{actual} \frac{1}{\left(1 + \frac{\Delta L}{L_{ac0}}\right)}$$

Assume that during servo write there is a $f_0$ error component that gets written in $L_{ac}=T_0(V_0+\Delta V \sin(2\pi f_0))$ $L_{ac}=T_0V_0+T_0\Delta V \sin(2\pi f_0)=L_{ac0}+\Delta L \sin(2\pi f_0)$ $\Delta L=\Delta L_0 \sin(2\pi f_0)$ $$PES = PES_{actual} \frac{1}{\left(1 + \frac{\Delta L_0}{L_{ac0}}\sin(2\pi f_0)\right)}$$

Figure 5:
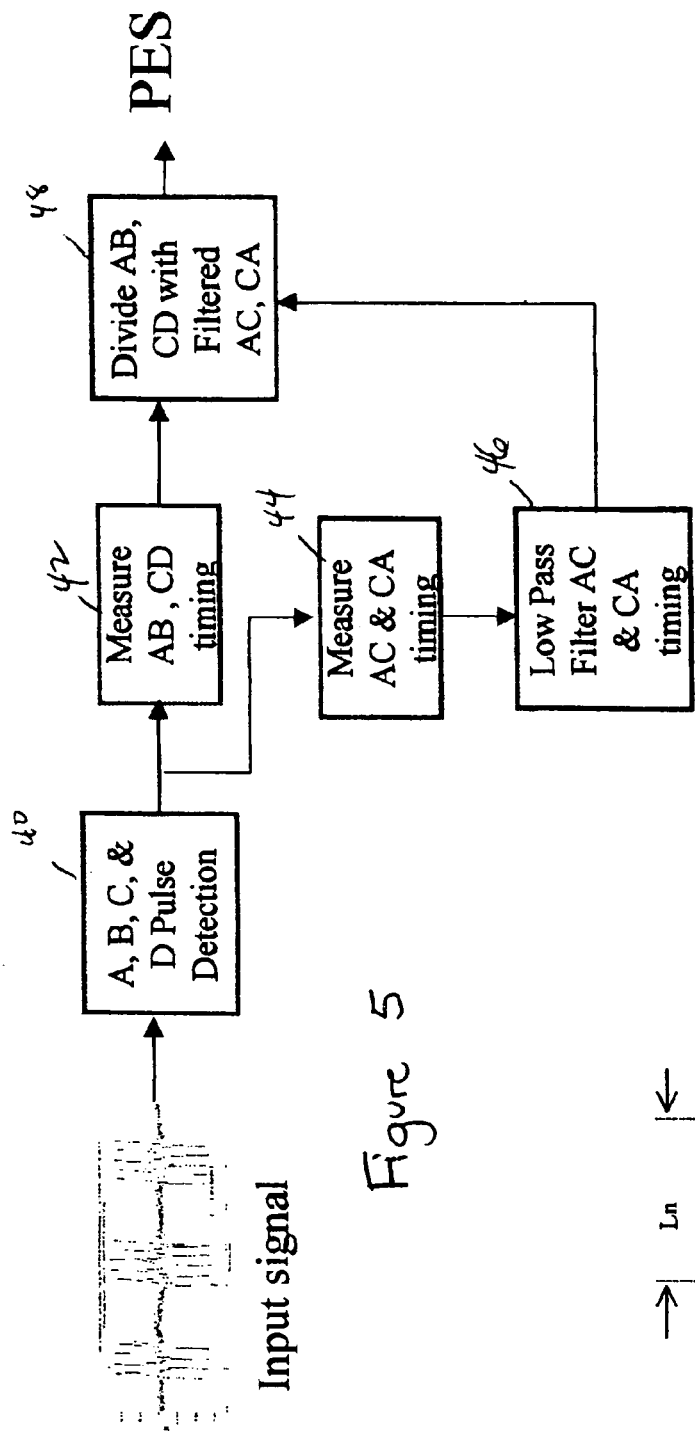
FIG. 5 is a block diagram of an exemplary embodiment of an algorithm performed by the PES detector of the present invention.
Figure 6:
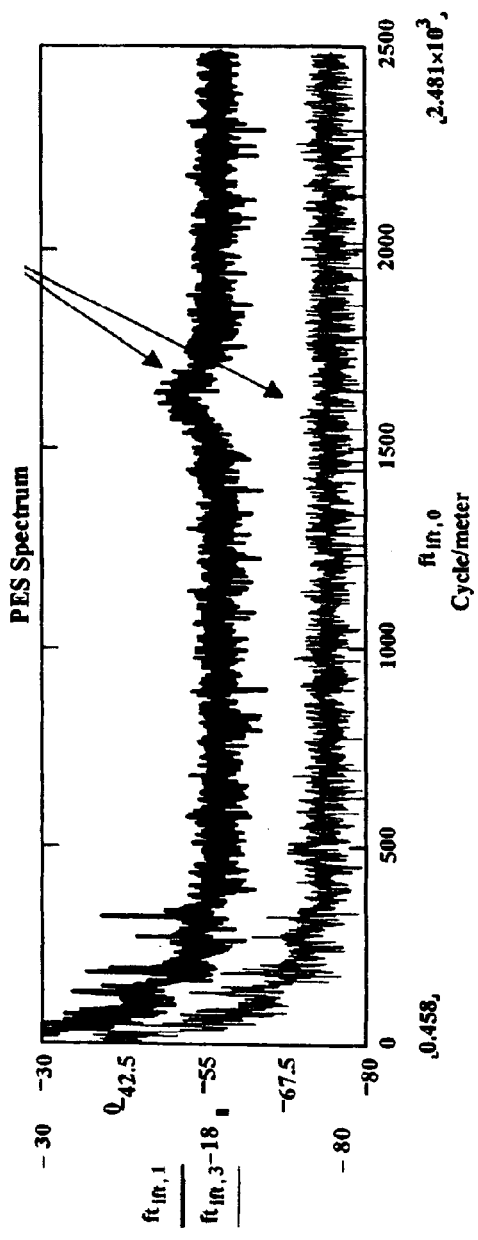
FIGS. 6 and 7 depict exemplary Fast Fourier Transform (FFT) displays of effective filtering in accordance with embodiments of the present invention.
Figure 7:
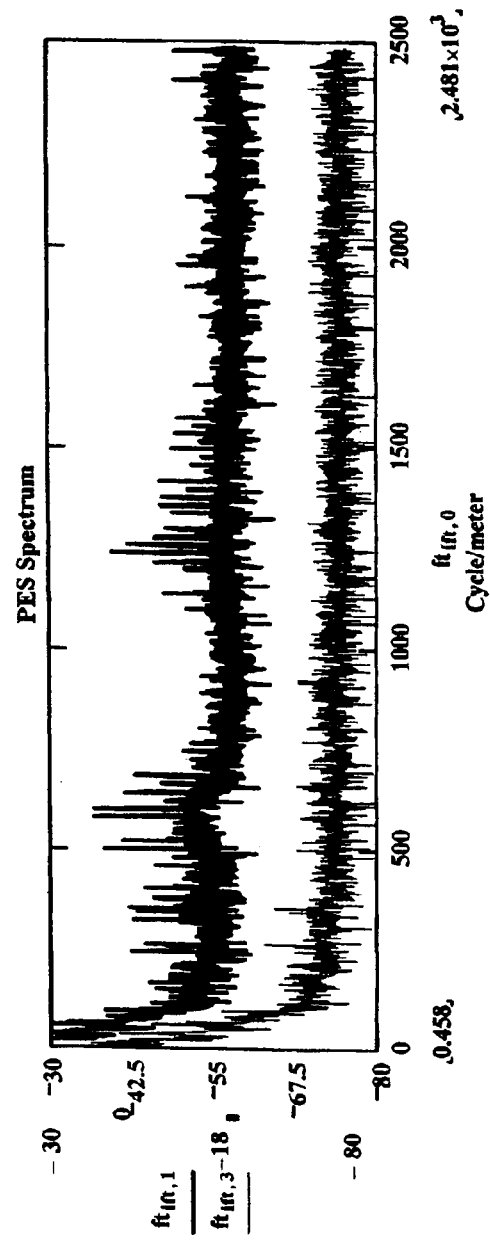

As will be seen in FIGS. 6 and 7, the raw PES data has extensive high frequency content that causes errors to the tracking loop. One possible method to ameliorate this condition is to simply filter the PES signal above such frequency using IIR (Infinite Impulse Response) type filters. This method causes the filter to be in-loop with the tracking loop compensator, thus causing bandwidth limitations to the servo, translating into loss of performance. The present invention, however, filters the AC and CA timings only. This may be accomplished by employing an FIR (Finite Impulse Response) or IIR filter, for example, and dividing the instantaneous values of the AB and CD time values with these filtered timing values. A block diagram of the algorithm performed by the controller 26 of the present invention is depicted in FIG. 5.

The raw input signal is received at block 40 which performs pulse detection of the A, B, C and D servo marks (stripes). The AB, CD timing is measured by the controller 26 in block 42. In a parallel path, the AC and CA timing is measured in block 44. A low pass filtering on the AC and CA timing is performed in step 46. The filtering, as discussed above, may be performed by an FIR filter or IIR filter, for example. In certain embodiments of the invention, a conventional 30 sample average method may be employed in the filtering. In block 48, the AB, CD timing is divided by the filtered AC, CA timing. The output from block 48 is the PES ratio with a filtered spatial component in accordance with the embodiments of the present invention. The controller 26, which contains this PES determiner that forms the algorithm depicted in FIG. 5, uses the PES signal that has been generated to adjust the position of the recording head 16 accordingly.

FIG. 6 shows a plot of a sample PES FFT display showing the written-in noise and the effect of filtering for a first type of commercially available tape. The data shows that the format had a written-in error at 1600 cycles/m. At 4.153 m/s, this results in 6.645 KHz resonance signal, which is one half the servo sample rate. When used, this type of tape cartridge results in high acoustic noise, as well as exhibiting large spikes at the voice coil motor demand. The top plot in the display is the PES signal prior to the filtering in accordance with the present invention. The bottom plot uses filtered AC and CA values, eliminating the spatial error component noise, in accordance with the invention.

Similar results are depicted in FIG. 7 for a different type of tape that was tested. The very high frequency format errors, above about 300 cycles/m, are removed by the present invention, as a comparison of the top plot (without compensation) and the bottom plot (with compensation) shows.

With the present invention, since AB and CD timings are the only information with the position feedback, this method of the invention does not put the filter in-line with the tracking loop. Accordingly, while the noise is able to be attenuated, the high bandwidth characteristics of the actual position feedback are preserved. Since the noise signal frequency moves around with the tape speed, the filter used to smooth out the AC and CA timing is adaptively computed based on the tape speed.

The present invention thus provides an apparatus and method to filter out written-in tape speed related fluctuations that can result in position errors in a tracking servo system, without compromising position feedback signal integrity and also without introducing time delays to the tracking loop computation.

Although the present invention has been described and illustrated in detail, it is to be clearly understood that the same is by way of illustration and example only and is not to be take by way of limitation, the scope of the present invention being limited only by the terms of the appended claims.

What is claimed is:

1. A tape drive comprising:
    a servo mark detector to detect servo marks on a tape and generate a detection signal, the servo marks recorded on the tape in a first set of servo marks recorded simultaneously and a second set of servo marks recorded simultaneously and subsequently to the recording of the first set of servo marks; and
    a position error signal (PES) determiner coupled to the servo mark detector to receive the detection signal, the PES determiner: measuring a first time between servo marks within the first set of servo marks, and a second time between the first set of servo marks and the second set of servo marks; filtering the second time; and dividing the first time by the filtered second time to determine the PES.

2. The tape drive of claim 1, wherein the filtering is a low pass filtering.

3. The tape drive is of claim 2, wherein the PES determiner includes a finite impulse response (FIR) filter that performs the low pass filtering.

4. The tape drive of claim 2, wherein the PES determiner includes an infinite impulse response (IIR) filter that performs the low pass filtering.

5. The tape drive of claim 1, wherein the first set of servo marks includes at least two servo marks oriented at different azimuth angles from each other and the second set of servo marks includes at least two servo marks oriented at different azimuth angles from each other.

6. The tape drive of claim 5, further comprising a head positioning system coupled to the PES determiner to receive the PES and adjust the position of a write/read head as a function of the PES.

7. The tape drive of claim 5, wherein the first set of marks includes positive azimuth angle marks (A) and negative azimuth angle marks (B), and the second set of marks includes positive azimuth angle marks (C) and negative azimuth angle marks (D).

8. The tape drive of claim 6, wherein the PES determiner measures the time between the A and B marks as the first time and the time between the A and C marks as the second time.

9. The tape drive of claim 8, wherein the PES determiner: measures a third time between the C and D marks, and a fourth time between the C and A marks; filters the fourth time; and divides the third time by the filtered fourth time to determine the PES.

10. The tape drive of claim 8, wherein the filtering is a 30 sample averaging.

11. A method of compensating for written in format tracking error in a tape drive, comprising the steps of:
    obtaining timing signals from detected servo marks on a tape;
    filtering a spatial error component from the timing signals without filtering a lateral displacement component; and
    determining a position error signal from the timing signals after the filtering of the spatial error component.

12. The method of claim 11, wherein the timing signals include a first timing signal measuring a time between detection of servo marks previously recorded on the tape simultaneously and spaced apart from one another.

13. The method of claim 12, wherein the timing signals include a second timing signal measuring a time between detection of servo marks previously recorded on the tape non-simultaneously and spaced apart from one another.

14. The method of claim 13, wherein the filtering includes low pass filtering the second timing signal to form a filtered second timing signal.

15. The method of claim 14, wherein the determining a position error signal includes dividing the first timing signal by the filtered second timing signal.

16. The method of claim 15, wherein the servo marks previously recorded on the tape simultaneously include a first set of servo marks including least one positive azimuth angle servo stripe and at least one negative azimuth angle servo stripe.

17. The method of claim 16, wherein the servo marks previously recorded on the tape non-simultaneously include the first set of servo marks and a second set of servo marks recorded at a different time than the first set of servo marks, the second set of servo marks including at least one positive azimuth angle servo stripe and at least one negative azimuth angle servo stripe.

18. The method of claim 17, wherein the low pass filtering includes 30 sample averaging.

19. The method of claim 18, further comprising adjusting the position of a write/read head as a function of the position error signal.

20. A tape drive with a tracking servo system, comprising:
    a servo mark detector; and
    means for generating a position error signal (PES) with a filtered spatial error component.

* * * * *